(12) United States Patent
Yoon et al.

(10) Patent No.: US 8,692,831 B2
(45) Date of Patent: Apr. 8, 2014

(54) PARALLEL OPERATION PROCESSING APPARATUS AND METHOD

(75) Inventors: Hyung Min Yoon, Seoul (KR); Oh Young Kwon, Seongnami-si (KR); Byung In Yoo, Seoul (KR); Chang Mug Lee, Cheonan-si (KR); Hyo Seok Seo, Cheonan-si (KR)

(73) Assignees: Samsung Electronics Co., Ltd., Suwon-Si (KR); Korea University of Technology and Education Industry-University Cooperation Foundation, Cheonan-Si (KR)

( * ) Notice: Subject to any disclaimer, the term of this patent is extended or adjusted under 35 U.S.C. 154(b) by 622 days.

(21) Appl. No.: 12/801,838

(22) Filed: Jun. 28, 2010

(65) Prior Publication Data

US 2011/0187712 A1 Aug. 4, 2011

(30) Foreign Application Priority Data

Feb. 1, 2010 (KR) .......................... 10-2010-0009142

(51) Int. Cl.
*G06T 13/00* (2011.01)
*G09G 5/00* (2006.01)
*G06F 15/00* (2006.01)

(52) U.S. Cl.
USPC ........... 345/475; 345/473; 345/474; 345/643; 345/644; 345/501

(58) Field of Classification Search
None
See application file for complete search history.

(56) References Cited

U.S. PATENT DOCUMENTS

| 4,600,919 | A  | * | 7/1986  | Stern .............................. 345/473 |
| 6,628,286 | B1 | * | 9/2003  | Comair et al. ................. 345/473 |
| 2006/0146057 | A1 |  | 7/2006  | Blythe |
| 2007/0047802 | A1 |  | 3/2007  | Puri |
| 2007/0159488 | A1 |  | 7/2007  | Danskin et al. |
| 2007/0296725 | A1 |  | 12/2007 | Steiner et al. |
| 2008/0028414 | A1 |  | 1/2008  | Couture-Gagnon et al. |
| 2010/0091018 | A1 | * | 4/2010  | Tatarchuk et al. ............ 345/423 |
| 2011/0018880 | A1 | * | 1/2011  | Whited et al. ................. 345/473 |

FOREIGN PATENT DOCUMENTS

| KR | 10-2008-0022544 | 3/2008 |
| KR | 10-0849693 | 7/2008 |
| KR | 10-2009-0027550 | 3/2009 |
| KR | 10-2009-0065100 | 6/2009 |
| KR | 10-2009-0096143 | 9/2009 |
| KR | 10-0919236 | 9/2009 |

* cited by examiner

*Primary Examiner* — Maurice L McDowell, Jr.
*Assistant Examiner* — Donna J Ricks
(74) *Attorney, Agent, or Firm* — Staas & Halsey LLP

(57) ABSTRACT

Provided is a parallel operation processing apparatus and method. The parallel operation processing apparatus and method may generate an interpolated matrix with respect to a character included in each of a current frame and a next frame using a matrix corresponding to each of the current frame and the next frame generated, based on joint information corresponding to a plurality of joints included in the character. Also, the parallel operation processing apparatus and method may display an interpolated frame using the interpolated matrix.

21 Claims, 8 Drawing Sheets

PARALLEL OPERATION PROCESSING APPARATUS AND METHOD

CROSS-REFERENCE TO RELATED APPLICATIONS

This application claims the priority benefit of Korean Patent Application No. 10-2010-0009142, filed on Feb. 1, 2010, in the Korean Intellectual Property Office, the disclosures of which are incorporated herein by reference.

BACKGROUND

1. Field

Exemplary embodiments relate to a parallel operation processing method and apparatus, and particularly, to a parallel operation processing method and apparatus that may divide operations performed in a control apparatus, and perform the divided operations.

2. Description of the Related Art

Currently, along with developments in image technologies, three-dimensional (3D) games or 3D animations have been increasingly commercialized. For 3D images, a relatively greater amount of operations may need to be processed in comparison with 2D images. For example, in the 3D games, a character may be configured of a hierarchical joint structure. In this instance, a movement of the character may be created by a transformation of each joint in a hierarchical manner.

In general, a previous frame, a current frame, and a next frame may be consecutively displayed to express the movement of the character. In this instance, to more naturally express the movement of the character, an interpolated frame may be generated. The interpolated frame may be displayed between the current frame and the next frame.

In this case, the interpolated frame may be generated by performing an interpolated operation based on the current frame. In addition, along with an increase in a number of characters included in the current frame, an amount of operations to be processed and an amount of time for the operations to be processed may increase.

Accordingly, there is a desire for a technique that may reduce an amount of time for operations to be processed while naturally expressing movements of the characters, even when the number of the characters included in the corresponding frame increases.

SUMMARY

According to an aspect of exemplary embodiments, there is provided a parallel operation processing method, including: receiving a matrix corresponding to a current frame comprised of first joint information corresponding to at least one joint based on at least one character included in the current frame; receiving a matrix corresponding to a next frame comprised of second joint information corresponding to at least one joint included in a character of the next frame, based on at least one character included in the next frame; calculating a thread block unit using a dimension of the matrix corresponding to the current frame or the next frame; generating an interpolated matrix by performing an interpolated operation in the calculated thread block unit, based on a plurality of vectors included in each matrix corresponding to the current frame and the next frame; and forwarding the generated interpolated matrix.

The calculating of the thread block unit may calculate the thread block unit for simultaneously performing the interpolated operation using the first joint information and the second joint information.

Also, the generating of the interpolated matrix may include: dividing the matrices corresponding to the current frame and the next frame based on the thread block unit when the dimension of each of the matrices corresponding to the current frame and the next frame exceeds the calculated thread block unit; and performing the interpolated operation in parallel based on the matrices corresponding to the divided current frame and the divided next frame. The generating of the interpolated matrix may generate the interpolated matrix based on a result of the interpolated operation having been performed in parallel.

Also, each of the first joint information and the second joint information may include a plurality of translation vectors, a plurality of rotation vectors, and a plurality of scale vectors, each of the plurality of translation vectors, the plurality of rotation vectors, and the plurality of scale vectors corresponding to the at least one joint included in the character.

Also, the matrix corresponding to the current frame may include a plurality of translation vectors, a plurality of rotation vectors, and a plurality of scale vectors, each of the plurality of translation vectors, the plurality of rotation vectors, and the plurality of scale vectors corresponding to the at least one joint included in the current frame.

Also, the matrix corresponding to the next frame may include a plurality of translation vectors, a plurality of rotation vectors, and a plurality of scale vectors, each of the plurality of translation vectors, the plurality of rotation vectors, and the plurality of scale vectors corresponding to the at least one joint included in the next frame.

According to another aspect of exemplary embodiments, there is provided a parallel operation processing apparatus, including: a calculation unit to receive a matrix corresponding to each of a current frame and a next frame, based on at least one character included in each of the current frame and the next frame, and to calculate a thread block unit using a dimension of the received matrix corresponding to the current frame or the next frame; and an interpolated matrix generation unit to generate an interpolated matrix by performing an interpolated operation in the calculated thread block unit, based on a plurality of vectors included in each matrix corresponding to the current frame and the next frame. In this instance, the matrix corresponding to the current frame may be comprised of first joint information corresponding to at least one joint included in the at least one character of the current frame, and the matrix corresponding to the next frame may be comprised of second joint information corresponding to at least one joint included in the at least one character of the next frame.

According to still another aspect of exemplary embodiments, there is provided a parallel operation processing method, including: extracting first joint information corresponding to at least one joint based on the at least one character included in the current frame; generating a matrix corresponding to the current frame comprised of the first joint information; extracting second joint information corresponding to at least one joint included in at least one character of a next frame, based on the at least one character included in the next frame; generating a matrix corresponding to the next frame comprised of the second joint information; forwarding the matrix corresponding to each of the current frame and the next frame; receiving an interpolated matrix generated based on the matrix corresponding to each of the forwarded current and next frames; and generating an interpolated frame using the interpolated matrix.

According to yet another aspect of exemplary embodiments, there is provided a parallel operation processing apparatus, including: an extraction unit to extract first joint information corresponding to at least one joint included in at least one character of a current frame, based on the at least one character included in the current frame, and to extract second joint information corresponding to at least one joint based on the at least one character included in the next frame; a matrix generation unit to generate a matrix corresponding to the current frame comprised of the first joint information and to generate a matrix corresponding to the next frame comprised of the second joint information; and an interpolated frame generation unit to receive an interpolated matrix generated based on the matrix corresponding to each of the current frame and the next frame, and to generate an interpolated frame using the received interpolated matrix.

According to another aspect of exemplary embodiments, there is provided at least one computer readable medium storing computer readable instructions to implement methods of exemplary embodiments.

A parallel operation processing method and apparatus may process, in a thread block, an interpolation operation in parallel, thereby reducing an amount of operations to be processed.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
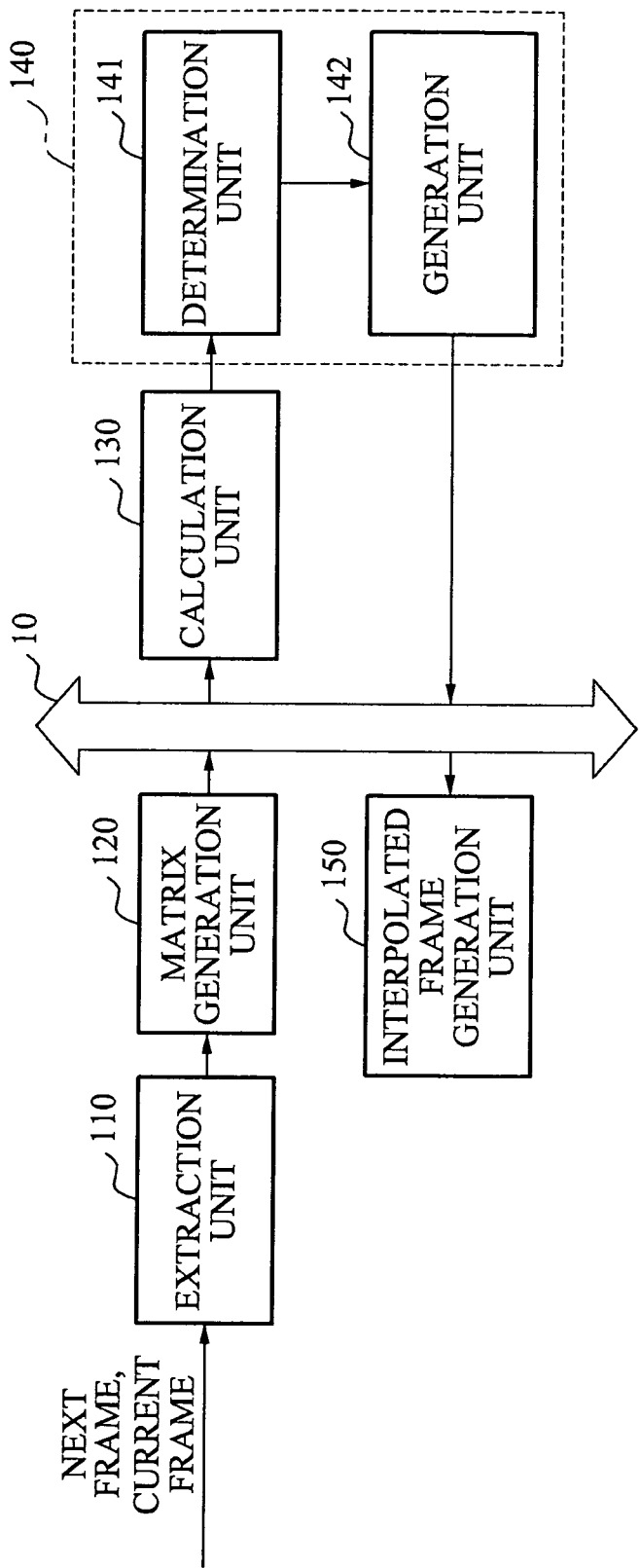
FIG. 1 illustrates a configuration of a parallel operation processing apparatus according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates a configuration of a parallel operation processing apparatus according to exemplary embodiments.

Referring to FIG. 1, the parallel operation processing apparatus includes an extraction unit 110, a matrix generation unit 120, a calculation unit 130, an interpolated matrix generation unit 140, and an interpolated frame generation unit 150.

As illustrated in FIG. 1, the extraction unit 110, the matrix generation unit 120, and the interpolated frame generation unit 150 may be configured of one chip, similar to a central processing unit (CPU). Similarly, the calculation unit 130 and the interpolated matrix generation unit 140 may be configured of one chip, similar to a graphics processing apparatus. For example, as the graphics processing apparatus, a graphics processing unit (GPU) and a general purpose processing on graphics processing unit (GPGPU) may be used. The extraction unit 110 may extract first joint information with respect to (based on) at least one character included in a current frame. Also, the extraction unit 110 may extract second joint information with respect to at least one character included in a next frame.

Figure 4:
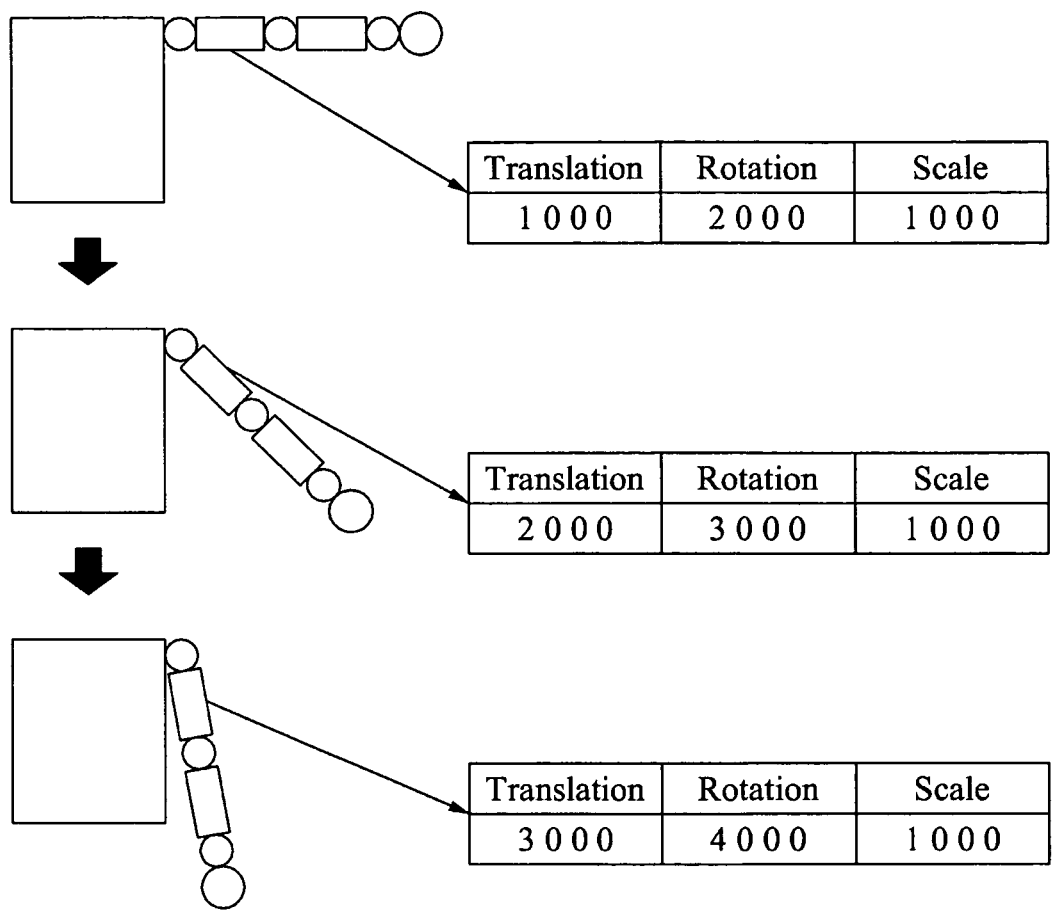
FIG. 4 is a diagram used for describing a translation vector, a rotation vector, and a scaling vector corresponding to a joint according to exemplary embodiments.

As illustrated in FIG. 4, each of the first joint information and the second joint information may include a plurality of translation vectors, a plurality of rotation vectors, and a plurality of scale vectors, each of the plurality of translation vectors, the plurality of rotation vectors, and the plurality of scale vectors corresponding to the at least one joint included in the character.

Figure 3:
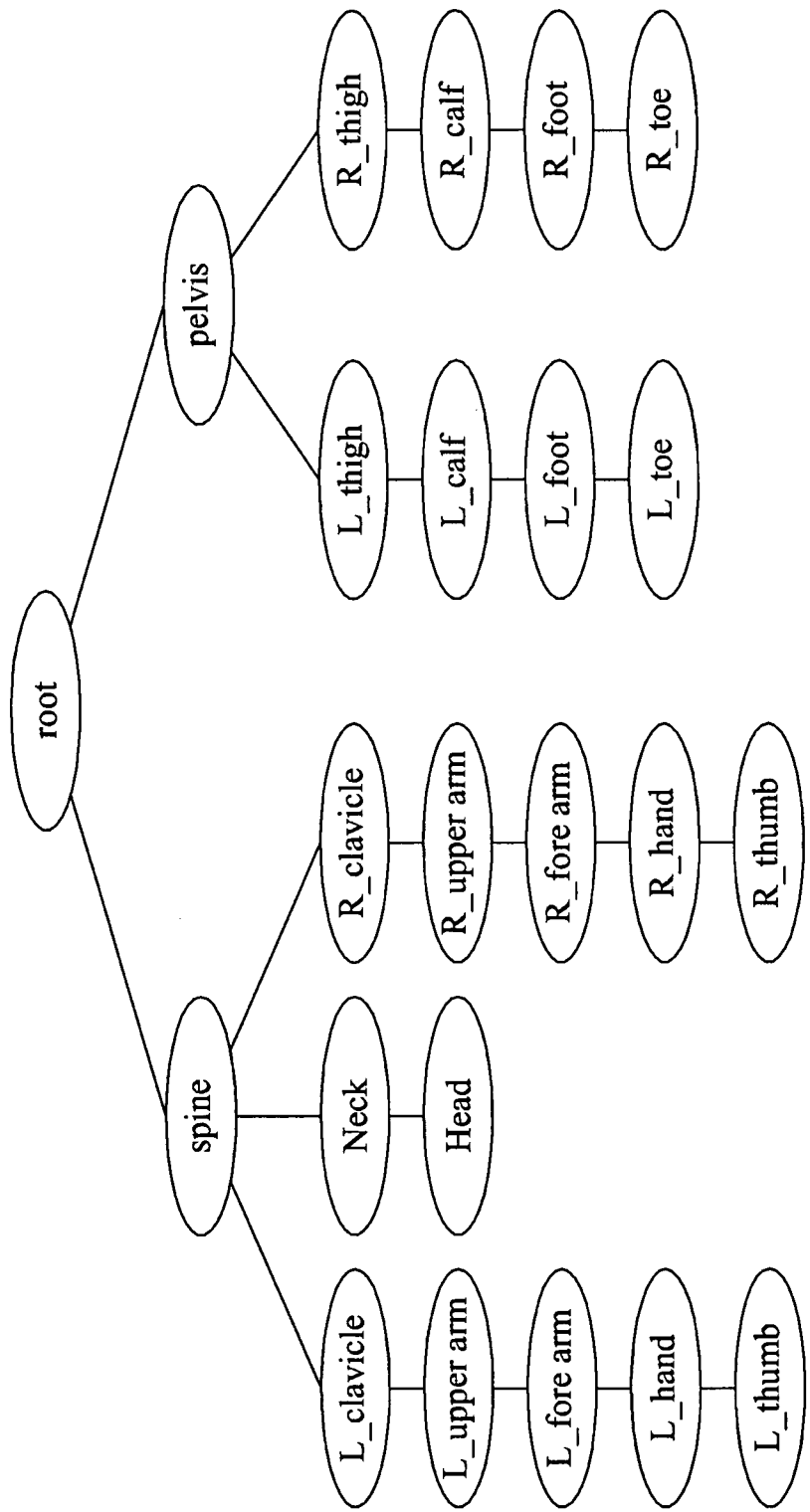

For example, the current frame may include a plurality of characters, and each of the plurality of characters may include a plurality of joints such as a head, a neck, an upper arm, a pelvis, a foot, and the like. In this instance, the plurality of joints may be configured of a hierarchical structure as illustrated in FIG. 3. In FIGS. 3 and 4, a root may signify a starting point of a movement of the character, and a navel of the character may be used as the root.

The matrix generation unit 120 may generate a matrix corresponding to the current frame comprised of the first joint information. Also, the matrix generation unit 120 may generate a matrix corresponding to the next frame comprised of the second joint information.

For example, when a single character is included in the current frame, eight joints are included in the single character, and a number of each of the translation vectors, the rotation vectors, and the scale vectors is four, the matrix generation unit 120 may generate a matrix, having a dimension of 4×4, corresponding to the current frame for each of the eight joints.

Specifically, the matrix generation unit 120 may generate eight matrices, each matrix having a dimension of 4×4, corresponding to the current frame. In this instance, a first row of the generated matrix may be comprised of the plurality of translation vectors, a second row thereof may be comprised of the plurality of rotation vectors, and a third row thereof may be comprised of the plurality of scale vectors. Also, a fourth row of the generated matrix may be comprised of homogeneous coordinates. For example, the homogeneous coordinates (w) may be used when converting the character into a 3D image, and may be determined as 1'.

Similarly, the matrix generation unit 120 may generate a matrix corresponding to the next frame, of which each row is comprised of the translation vectors, the rotation vectors, and the scale vectors.

Also, the matrix generation unit 120 may re-generate the matrix corresponding to the current frame and the matrix corresponding to the next frame using a number of the joints included in the character and a number of pieces of the first joint information or the second joint information.

A number of each of rows and columns of the matrix corresponding to the re-generated current frame may be determined based on the number of the joints included in the character and the number of pieces of the first joint information. Similarly, a number of each of rows and columns of the matrix corresponding to the re-generated next frame may be determined based on the number of the joints included in the character and the number of pieces of the second joint information.

For example, when eight joints are included in the character and eight matrices, each having a dimension of 4×4, corresponding to the current frame are generated, the matrix generation unit 120 may re-generate a matrix, having a dimension of 8×12, corresponding to the current frame. In this instance, each of rows of the re-generated matrix may be separated into eight joints, and each of columns of the re-generated matrix may include four translation vectors, four rotation vectors, and four scale vectors corresponding to each of the eight joints.

In the same manner, the matrix generation unit 120 may re-generate a matrix, having a dimension of 8×12, corresponding to the next frame.

Also, the matrix generation unit 120 may forward, to the calculation unit 130 via a bus 10, the matrix corresponding to each of the re-generated current frame and the re-generated next frame.

The calculation unit 130 may receive, via the bus 10, the matrix corresponding to each of the re-generated current frame and the re-generated next frame obtained in the generation unit 120. Also, the calculation unit 130 may calculate a thread block unit using a dimension of the matrix corresponding to the received current frame or the received next frame. The thread block may be a unit for simultaneously processing an interpolated operation.

For example, when the matrix corresponding to the re-generated current frame has a dimension of 8×12, the calculation unit 130 may calculate a number of each of columns of the thread block using 12, that is, the number of each of columns of the matrix. In this instance, 12, that is, the number of each of columns of the matrix may be determined as the number of each of columns of the thread block.

Figure 5:
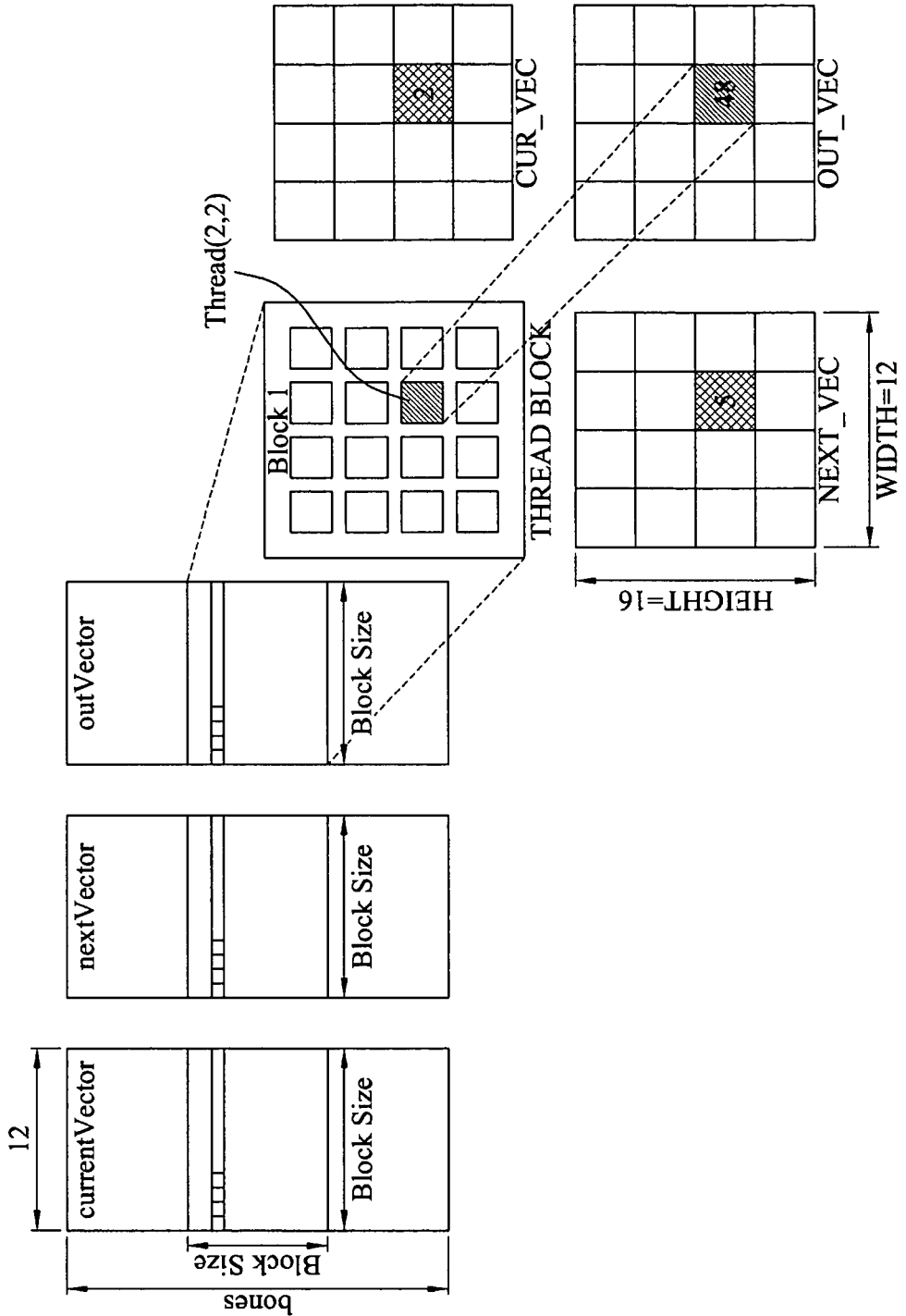
FIG. 5 is a diagram used for describing a thread block according to exemplary embodiments.

Accordingly, as shown in Equation 1 below, the calculation unit 130 may calculate a number of each of rows of the thread block, so that a product of the number of each of rows of the thread block and '12' of the number of each of the columns of the thread block is a value satisfying a multiple of '16' and less than or equal to '256'. As illustrated in FIG. 5, the calculated number of each of rows of the thread block may be '20', and thus '20' of the number of each of rows of the thread block may be used as the thread block unit.

$$(\text{a number of each of columns of thread block}) \times (\text{a number of each of rows of thread block}) \leq 256 \quad \text{[Equation 1]}$$

In this instance, in Equation 1, the number of each of rows of the thread block may be a multiple of '16'.

The interpolated matrix generation unit 140 may perform the interpolated operation in parallel with respect to the matrix corresponding to each of the current frame and the next frame. In this instance, the interpolated matrix generation unit 140 may include a determination unit 141 and a generation unit 142.

The determination unit 141 may compare a dimension of the matrix corresponding to each of the current frame and the next frame with the thread block unit. Thereafter, when the dimension of the matrix corresponding to each of the current frame and the next frame exceeds the thread block unit based on the compared result, the matrix corresponding to each of the current frame and the next frame may be divided into a plurality of sub matrices.

For example, when the matrix, having a dimension of 40×12, corresponding to each of the current frame and the next frame is transmitted via the bus 10, that is, when a number of characters included in each of the current frame and the next frame is '1', and a number of joints included in the character is '40', the determination unit 141 may compare '40' of the number of each of rows of the matrix corresponding to the current frame with '20' of the thread block unit.

In this instance, when '40' of the number of each of rows of the matrix exceeds '20' of the thread block unit, the determination unit 141 may divide the matrix corresponding to the current frame into two sub matrices each having a dimension of 20×12, based on '20' of the thread block unit.

In the same manner, when a number of each of columns of a matrix corresponding to the next frame exceeds the thread block unit, the determination unit 141 may divide the matrix corresponding to the next frame into a plurality of sub matrices. The plurality of sub matrices corresponding to the divided current frame and the divided next frame may be transmitted to the generation unit 142.

In this instance, when a number of each of rows of the matrix corresponding to each of the current frame and the next frame is less than or equal to the thread block unit, the determination unit 141 may forward, to the generation unit 142, the matrix corresponding to each of the current frame and the next frame. Specifically, the determination unit 141 may not divide, into the plurality of sub matrices, the matrix corresponding to each of the current frame and the next frame.

When the matrix corresponding to each of the current frame and the next frame is divided into the plurality of sub matrices, the generation unit 142 may perform the interpolated operation in parallel with respect to the divided plurality of sub matrices to thereby generate an interpolated matrix. In this instance, the generation unit 142 may simultaneously perform the interpolated operation in the thread block unit, as illustrated in FIG. 5.

Also, when the matrix corresponding to each of the current frame and the next frame is not divided into the plurality of sub matrices, the generation unit 142 may perform the interpolated operation in parallel with respect to the matrix corresponding to each of the current frame and the next frame to thereby generate the interpolated matrix. In this instance, the generation unit 142 may generate the interpolated matrix using the following Equation 2.

$$\text{out\_vec} = \text{cur\_vec} + ((\text{next\_vec} - \text{cur\_vec}) \times s) \quad \text{[Equation 2]}$$

where 'out_vec' may denote an interpolated vector value constituting the interpolated matrix, 'cur_vec' may denote a vector value included in a matrix corresponding to the current frame, 'next_vec' may denote a vector value included in a matrix corresponding to the next frame, and 's' may denote a time when the interpolated frame is displayed. Further, 's' may be obtained as an average of a time when the current frame is displayed and a time when the next frame is displayed.

Accordingly, the generation unit 142 may generate an interpolated matrix comprised of interpolated vector values calculated using Equation 2.

In this instance, when calculating an interpolated vector value corresponding to a position (1, 1) of the interpolated matrix, the generation unit 142 may calculate the interpolated vector value using the vector value of the position (1,1) of the matrix corresponding to each of the current frame and the next frame. For example, the generation unit 142 may generate an interpolated matrix by performing the interpolated operation in parallel using a compute unified device architecture (CUDA).

Also, the generation unit 142 may generate the interpolated matrix having the same dimension as that of the matrix corresponding to each of the current frame and the next frame. Thereafter, the generation unit 142 may forward, to the interpolated frame generation unit 150, the generated interpolated matrix via the bus 10.

The interpolated frame generation unit 150 may generate an interpolated frame using the interpolated matrix forwarded via the bus 10.

Figure 7:
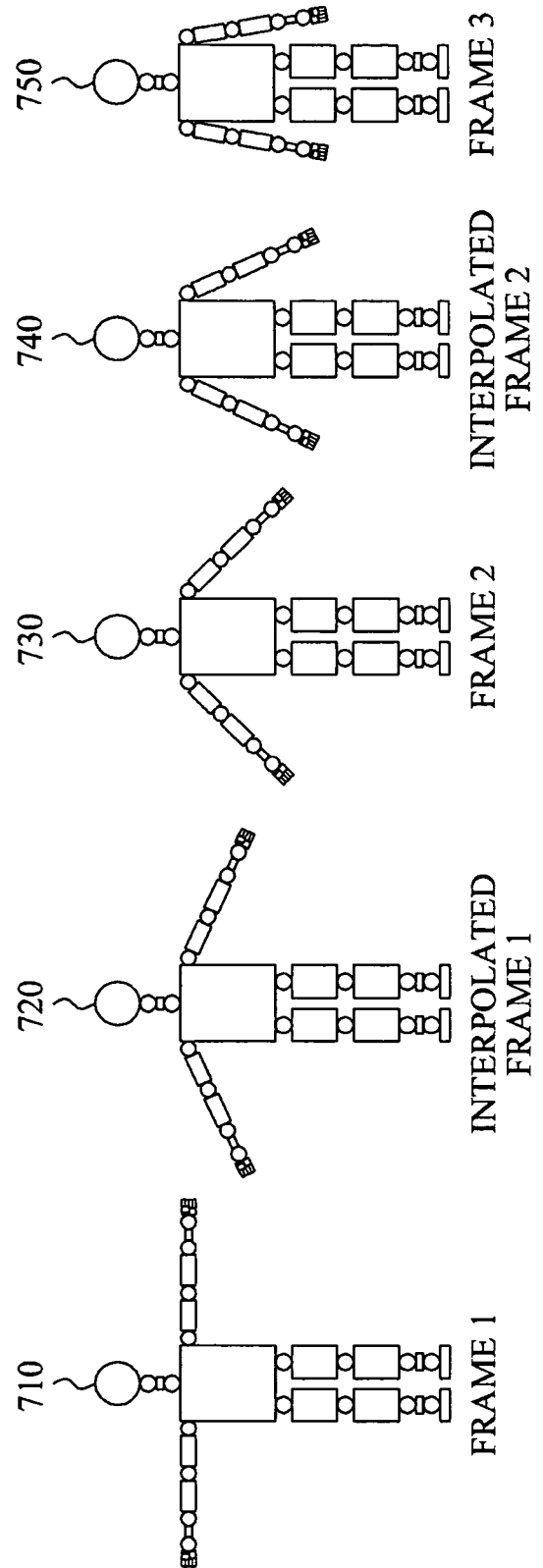

For example, as illustrated in FIG. 7, when a frame 1 is a current frame, and a frame 2 is a next frame, an interpolated frame (1) 720 may be displayed between the frame (1) 710 and the frame (2) 730. Similarly, when the frame 2 is the current frame, and a frame 3 is the next frame, an interpolated frame (2) 740 may be displayed between the frame (2) 730 and the frame (3) 750. In this manner, as the interpolated frames 1 and 2 are displayed between the frames 1 and 2 and between the frames 2 and 3, respectively, a movement of a corresponding character spreading both arms to another movement of the corresponding character coming to attention may be naturally displayed.

Figure 8:
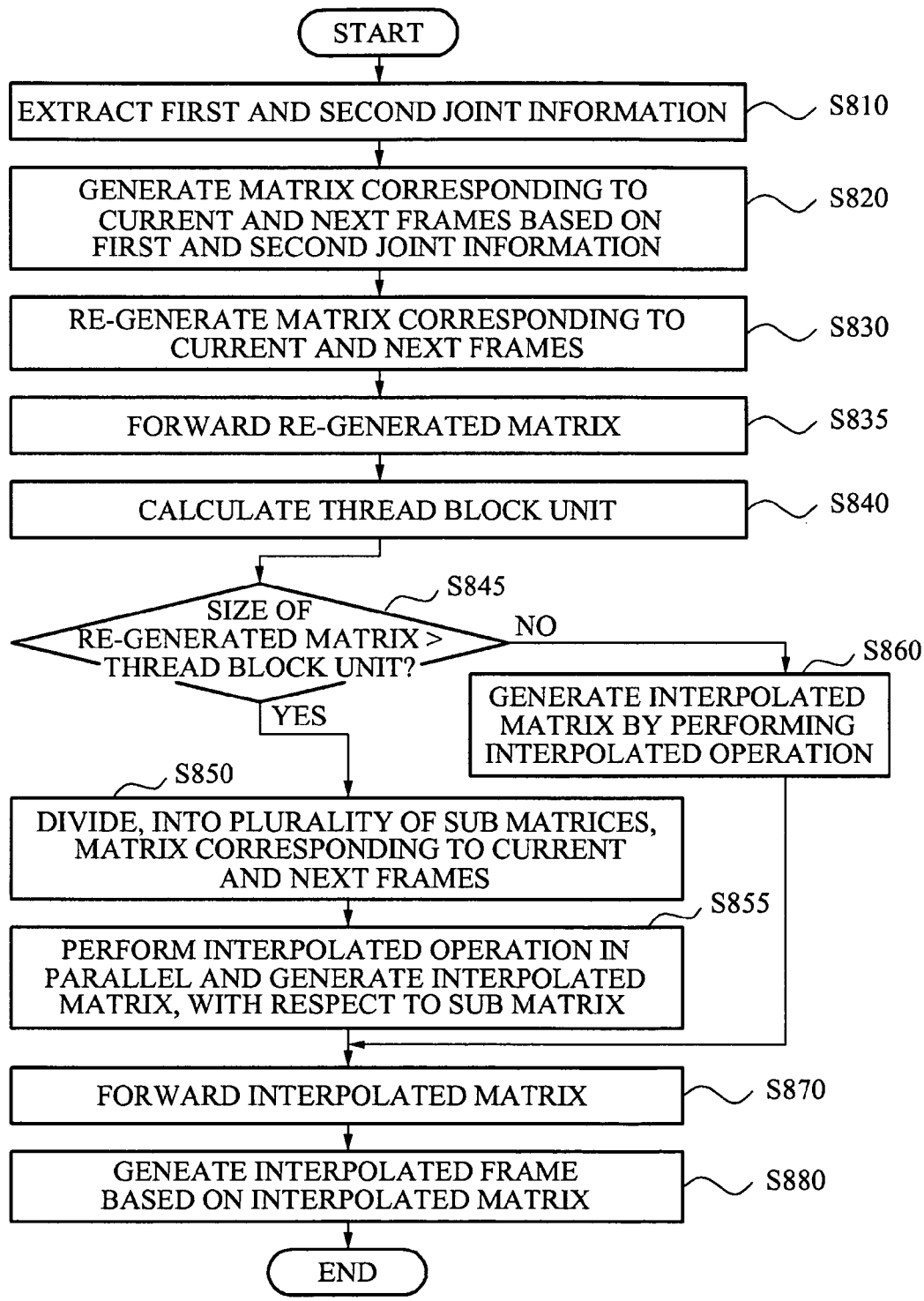
FIG. 8 is a flowchart illustrating operations of a parallel operation processing method according to exemplary embodiments.

FIG. 8 is a flowchart illustrating operations of a parallel operation processing apparatus according to exemplary embodiments.

Referring to FIG. 8, in operation S810, the extraction unit 110 may respectively extract first joint information and second joint information, with respect to a character included in each of a current frame and a next frame. The first joint information and the second joint information may include a plurality of translation vectors, a plurality of rotation vectors, and a plurality of scale vectors, each of the plurality of vectors corresponding to at least one joint included in the character.

In operation S820, the matrix generation unit 120 may generate, for each of the joints included in the character, a matrix corresponding to each of the current frame and the next frame based on the extracted first joint information and the extracted second joint information.

For example, the matrix generation unit 120 may generate a matrix corresponding to each of the current frame and the next frame. In this instance, a first row of the generated matrix may be comprised of a plurality of translation vectors, a second row of the generated matrix may be comprised of a plurality of rotation vectors, and a third row of the generated matrix may be comprised of a plurality of scale vectors.

In operation S830, the matrix generation unit 120 may re-generate the matrix corresponding to each of the current frame and the next frame, based on the matrix corresponding to each of the current frame generated for each joint and the next frame.

For example, the matrix generation unit 120 may re-generate the matrix corresponding to the current frame in such a manner that a number of each of rows of the matrix corresponding to the current frame is a number of joints, and a number of each of columns of the matrix corresponding to the current frame is a number of pieces of the first joint information. Accordingly, each of rows of the matrix corresponding to the re-generated current frame may be divided into joints included in the character, and each of columns of the matrix corresponding to the re-generated current frame may include a plurality of translation vectors, a plurality of rotation vectors, and a plurality of scale vectors. In this instance, each of the plurality of translation vectors, the plurality of rotation vectors, and the plurality of scale vectors may correspond to each of a plurality of joints.

In the same manner, the matrix generation unit 120 may re-generate the matrix corresponding to the next frame in such a manner that a number of each of rows of the matrix corresponding to the next frame is a number of joints included in the character, and a number of each of columns of the matrix corresponding to the next frame is a number of pieces of the second joint information.

In operation S835, the matrix generation unit 120 may forward the matrix corresponding to each of the re-generated current frame and the re-generated next frame. In this instance, the matrix corresponding to each of the re-generated current and next frames may be forwarded to a graphic processing apparatus via the bus 10. For example, as the graphic processing apparatus, a GPU and a GPGPU may be used.

In operation S840, the calculation unit 130 may calculate a thread block unit based on a dimension of the matrix corresponding to each of the current frame and the next frame.

For example, the calculation unit 130 may calculate the thread block unit using Equation 1.

In operation 845, the determination unit 141 may compare the calculated thread block unit and the dimension of the matrix corresponding to each of the re-generated current frame and the re-generated next frame. The dimension of the matrices corresponding to the current frame and the next frame may be the same.

For example, in operation S850, when a number of each of rows of the matrix corresponding to each of the current frame and the next frame exceeds the thread block unit (S845:YES), the determination unit 141 may divide, into a plurality of sub matrices, the matrix corresponding to each of the current frame and the next frame based on the thread block unit. Specifically, when the number of the joints included in the character is greater than the thread block unit, the matrix corresponding to each of the current frame and the next frame may be divided into the plurality of sub matrices.

Next, in operation S855, the generation unit 142 may perform an interpolated operation in parallel with respect to the divided plurality of sub matrices.

For example, the generation unit 142 may generate an interpolated matrix by performing the interpolated operation using Equation 2.

In this instance, in operation S86, when the number of each of rows of the matrix corresponding to each of the current frame and the next frame is less than or equal to the thread block unit (8845:NO), the generation unit 142 may generate the interpolated matrix by performing the interpolated operation using Equation 2.

Next, in operation S870, the generated interpolated matrix may be forwarded via the bus 10. For example, the interpolated matrix may be forwarded to a CPU.

Next, in operation S880, the interpolated frame generation unit 150 may generate the interpolated frame based on the interpolated matrix. Accordingly, the generated interpolated frame may be displayed between the current frame and the next frame.

Figure 2:
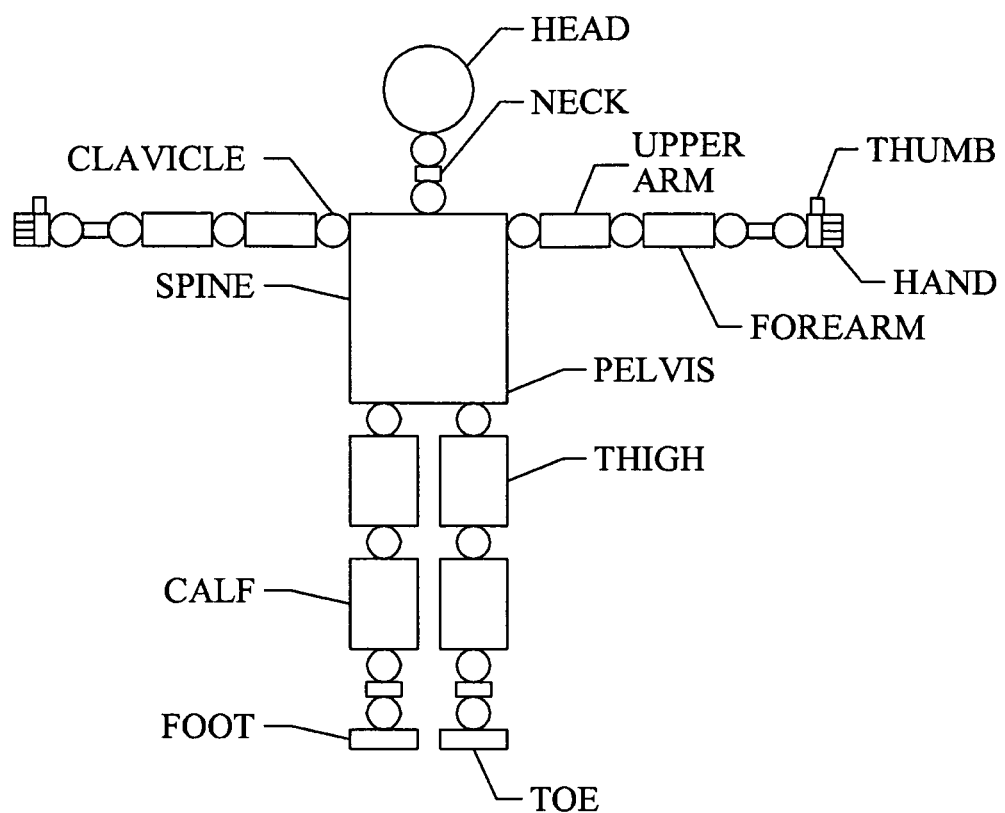
FIGS. 2 and 3 are diagrams used for describing joints included in a character according to exemplary embodiments.
Figure 6:
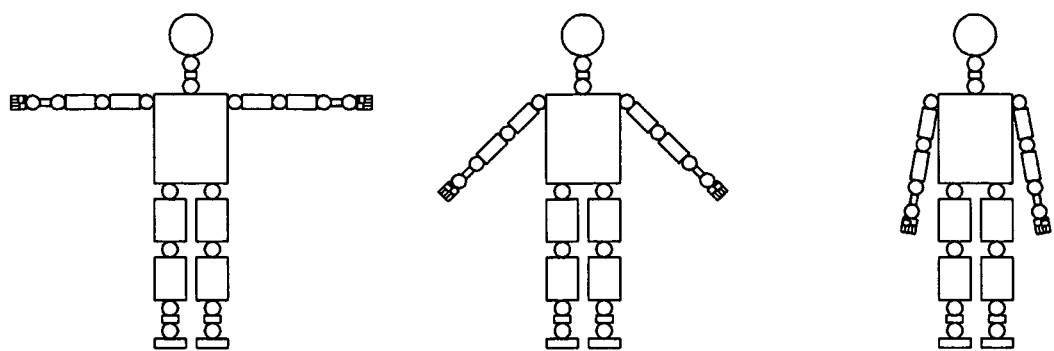
FIGS. 6 and 7 are diagrams used for describing an interpolated frame according to exemplary embodiments.

As described above, according to exemplary embodiments, the parallel operation processing apparatus and method that may generate the interpolated frame to naturally express changes in movements of a human being when the character included in each of the current frame and the next frame is a human being have been described with reference to FIGS. 2, 6, and 7, however, the exemplary embodiments are not limited thereto. Thus, the character may be one of all moving and living entities other than a human being.

Also, the parallel operation processing apparatus may perform the interpolated operation in parallel using a current frame and a next frame where an object is included, so that movements of the object included in each of the current frame and the next frame may be expressed.

Also, the parallel operation processing apparatus and method may perform the interpolated operation in parallel, based on the thread block unit, thereby reducing an operation time.

The above described method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A parallel operation processing method, comprising:
receiving a matrix corresponding to a current frame comprised of first joint information corresponding to at least one joint based on at least one character included in the current frame;
receiving a matrix corresponding to a next frame comprised of second joint information corresponding to at least one joint based on at least one character included in the next frame;
calculating a thread block unit using a dimension of the matrix corresponding to the current frame or the next frame using at least one processor;
generating an interpolated matrix by performing an interpolated operation in the calculated thread block unit based on a plurality of vectors included in each matrix corresponding to the current frame and the next frame; and
forwarding the generated interpolated matrix, wherein the calculating of the thread block unit calculates the thread block unit for simultaneously performing the interpolated operation using the first joint information and the second joint information.

2. The parallel operation processing method of claim 1, wherein the generating of the interpolated matrix includes:
dividing the matrices corresponding to the current frame and the next frame based on the thread block unit when the dimension of each of the matrices corresponding to the current frame and the next frame exceeds the calculated thread block unit; and
performing the interpolated operation in parallel based on the matrices corresponding to the divided matrices of the current frame and the divided matrices of the next frame, wherein
the generating of the interpolated matrix generates the interpolated matrix based on a result of the interpolated operation having been performed in parallel.

3. The parallel operation processing method of claim 1, wherein:

each of the first joint information and the second joint information includes a plurality of translation vectors, a plurality of rotation vectors, and a plurality of scale vectors, each of the plurality of translation vectors, the plurality of rotation vectors, and the plurality of scale vectors corresponding to the at least one joint included in the character,
the matrix corresponding to the current frame includes a plurality of translation vectors, a plurality of rotation vectors, and a plurality of scale vectors, each of the plurality of translation vectors, the plurality of rotation vectors, and the plurality of scale vectors corresponding to the at least one joint included in the current frame, and
the matrix corresponding to the next frame includes a plurality of translation vectors, a plurality of rotation vectors, and a plurality of scale vectors, each of the plurality of translation vectors, the plurality of rotation vectors, and the plurality of scale vectors corresponding to the at least one joint included in the next frame.

4. The parallel operation processing method of claim 1, wherein:
a number of each of rows and columns of the matrix corresponding to the current frame is respectively obtained based on a number of the at least one joint included in the character of the current frame and a number of pieces of the first joint information, and
a number of each rows and columns of the matrix corresponding to the next frame is respectively obtained based on a number of the at least one joint included in the character of the next frame and a number of pieces of the second joint information.

5. The parallel operation processing method of claim 4, wherein the calculating of the thread block unit calculates a number of rows of a thread block using a number of the columns of the matrix corresponding to the next frame or the current frame, and generates the thread block having the calculated number of the rows of the thread block and the number of the columns of the matrix as the magnitude of each of the rows and the columns of the matrix corresponding to the current frame or the next frame.

6. The parallel operation processing method of claim 1, wherein the generating of the interpolated matrix includes calculating a regeneration time of an interpolated frame using a regeneration time of the current frame and a regeneration time of the next frame, and generates the interpolated matrix by performing the interpolated operation based on the plurality of vectors included in the sub matrix corresponding to the current frame, the plurality of vectors included in the sub matrix corresponding to the next frame, and the calculated regeneration time of the interpolated frame.

7. A parallel operation processing apparatus, comprising:
a calculation unit to receive a matrix corresponding to each of a current frame and a next frame based on at least one character included in each of the current frame and the next frame, and to calculate a thread block unit using a dimension of the received matrix corresponding to the current frame or the next frame; and
an interpolated matrix generation unit to generate an interpolated matrix by performing an interpolated operation in the calculated thread block unit based on a plurality of vectors included in each matrix corresponding to the current frame and the next frame, wherein
the matrix corresponding to the current frame is comprised of first joint information corresponding to at least one joint included in the at least one character of the current frame, and the matrix corresponding to the next frame is comprised of second joint information corresponding to at least one joint included in the at least one character of the next frame, wherein the calculation unit calculates the thread block unit for simultaneously performing the interpolated operation using the first joint information and the second joint information.

8. The parallel operation processing apparatus of claim 7, wherein the interpolated matrix generation unit forwards, to a central processing unit (CPU), the interpolated matrix generated based on the calculated thread block unit.

9. The parallel operation processing apparatus of claim 7, wherein the interpolated matrix generation unit includes:
a determination unit to divide the matrix corresponding to each of the current frame and the next frame based on the thread block unit when a dimension of the matrix corresponding to each of the current frame and the next frame exceeds the calculated thread block unit based on a comparison between the dimension of the matrix corresponding to each of the current frame and the next frame and the calculated thread block unit; and
a generation unit to perform the interpolated operation in parallel based on the matrices corresponding to the divided matrices of the current frames and the divided matrices of the next frames, and to generate the interpolated matrix based on a result of the interpolated operation having been performed.

10. The parallel operation processing apparatus of claim 7, wherein:
each of the first joint information and the second joint information includes a plurality of translation vectors, a plurality of rotation vectors, and a plurality of scale vectors, each of the plurality of translation vectors, the plurality of rotation vectors, and the plurality of scale vectors corresponding to the at least one joint included in the character,
the matrix corresponding to the current frame includes a plurality of translation vectors, a plurality of rotation vectors, and a plurality of scale vectors, each of the plurality of translation vectors, the plurality of rotation vectors, and the plurality of scale vectors corresponding to the at least one joint included in the character of the current frame, and
the matrix corresponding to the next frame includes a plurality of translation vectors, a plurality of rotation vectors, and a plurality of scale vectors, each of the plurality of translation vectors, the plurality of rotation vectors, and the plurality of scale vectors corresponding to the at least one joint included in the character of the next frame.

11. The parallel operation processing apparatus of claim 7, wherein:
a number of each of rows and columns of the matrix corresponding to the current frame is respectively obtained based on a number of the at least one joint included in the character of the current frame and a number of pieces of the first joint information, and
a number of each of rows and columns of the matrix corresponding to the next frame is respectively obtained based on a number of the at least one joint included in the character of the next frame and a number of pieces of the second joint information.

12. The parallel operation processing apparatus of claim 11, wherein the calculation unit calculates a number of rows of a thread block using a number of the columns of the matrix corresponding to the next frame or the current frame, and generates the thread block having the calculated number of the rows of the thread block and the number of the columns of the matrix as the number of each of the rows and the columns of the matrix corresponding to the current frame or the next frame.

13. The parallel operation processing apparatus of claim 7, wherein the interpolated matrix generation unit calculates a regeneration time of an interpolated frame using a regeneration time of the current frame and a regeneration time of the next frame, and generates the interpolated matrix by performing the interpolated operation based on the plurality of vectors included in the sub matrix corresponding to the current frame, the plurality of vectors included in the sub matrix corresponding to the next frame, and the calculated regeneration time of the interpolated frame.

14. A parallel operation processing method, comprising:
extracting first joint information corresponding to at least one joint based on at least one character included in the current frame;
generating a matrix corresponding to the current frame comprised of the first joint information;
extracting second joint information corresponding to at least one joint based on at least one character included in the next frame;
generating a matrix corresponding to the next frame comprised of the second joint information;
forwarding the matrix corresponding to each of the current frame and the next frame;
receiving an interpolated matrix generated based on the matrix corresponding to each of the forwarded current and next frames; and
generating an interpolated frame using the interpolated matrix using at least one processor, wherein the interpolated matrix is generated by performing an interpolated operation in a thread block unit based on a plurality of vectors included in each matrix corresponding to the current frame and the next frame, the thread block unit is calculated using a dimension of the matrix, and the thread block unit is calculated for simultaneously performing the interpolated operation using the first joint information and the second joint information.

15. The parallel operation processing method of claim 14, wherein:
each of the first joint information and the second joint information includes a plurality of translation vectors, a plurality of rotation vectors, and a plurality of scale vectors, each of the plurality of translation vectors, the plurality of rotation vectors, and the plurality of scale vectors corresponding to the at least one joint included in the character,
the generating of the matrix corresponding to the current frame generates the matrix corresponding to the current frame comprised of the plurality of translation vectors, the plurality of rotation vectors, and the plurality of scale vectors based on at least one joint included in the character of the current frame, and
the generating of the matrix corresponding to the next frame generates the matrix corresponding to the next frame comprised of the plurality of translation vectors, the plurality of rotation vectors, and the plurality of scale vectors based on at least one joint included in the character of the next frame.

16. The parallel operation processing method of claim 14, wherein:
the generating of the matrix corresponding to the current frame generates the matrix corresponding to the current frame having a number of the at least one joint included in the character of the current frame and a number of pieces of the first joint information as a number of rows and columns of the matrix corresponding to the current frame, and the generating of the matrix corresponding to the next frame generates the matrix corresponding to the next frame having a number of the at least one joint included in the character of the next frame and a number of pieces of the second joint information as a number of rows and columns of the matrix corresponding to the next frame.

17. The parallel operation processing method of claim 14, further comprising:

displaying the current frame, the interpolated frame, and the next frame.

18. A parallel operation processing apparatus, comprising:

an extraction unit to extract first joint information corresponding to at least one joint based on at least one character included in the current frame, and to extract second joint information corresponding to at least one joint based on at least one character included in the next frame;

a matrix generation unit to generate a matrix corresponding to the current frame comprised of the first joint information and to generate a matrix corresponding to the next frame comprised of the second joint information; and an interpolated frame generation unit to receive an interpolated matrix generated based on the matrix corresponding to each of the current frame and the next frame, and to generate an interpolated frame using the received interpolated matrix, wherein the interpolated matrix is generated by performing an interpolated operation in a thread block unit based on a plurality of vectors included in each matrix corresponding to the current frame and the next frame, the thread block unit is calculated using a dimension of the matrix, and the thread block unit is calculated for simultaneously performing the interpolated operation using the first joint information and the second joint information.

19. The parallel operation processing apparatus of claim 18, wherein:

each of the first joint information and the second joint information includes a plurality of translation vectors, a plurality of rotation vectors, and a plurality of scale vectors, each of the plurality of translation vectors, the plurality of rotation vectors, and the plurality of scale vectors corresponding to the at least one joint included in the character, and the matrix generation unit generates the matrix corresponding to the current frame comprised of the plurality of translation vectors, the plurality of rotation vectors, and the plurality of scale vectors based on at least one joint included in the current frame, generates the matrix corresponding to the next frame comprised of the plurality of translation vectors, the plurality of rotation vectors, and the plurality of scale vectors based on at least one joint included in the next frame, and forwards, to a graphic processing apparatus, the generated matrix corresponding to each of the current frame and the next frame.

20. At least one non-transitory computer readable medium comprising computer readable instructions that control at least one processor to implement the method of claim 1.

21. At least one non-transitory computer readable medium comprising computer readable instructions that control at least one processor to implement the method of claim 14.

* * * * *

UNITED STATES PATENT AND TRADEMARK OFFICE
CERTIFICATE OF CORRECTION

PATENT NO. : 8,692,831 B2  
APPLICATION NO. : 12/801838  
DATED : April 8, 2014  
INVENTOR(S) : Yoon et al.

Page 1 of 1

It is certified that error appears in the above-identified patent and that said Letters Patent is hereby corrected as shown below:

On the Title Page Item [75] (Inventors), Line 2, delete "Seongnami-si" and insert -- Seongnam-si --, therefor.

Signed and Sealed this
Twenty-second Day of July, 2014

Michelle K. Lee
*Deputy Director of the United States Patent and Trademark Office*